US008101848B2

United States Patent
Kelly et al.

(10) Patent No.: US 8,101,848 B2
(45) Date of Patent: Jan. 24, 2012

(54) SOLAR PHOTOVOLTAIC OUTPUT FOR CLOUDY CONDITIONS WITH A SOLAR TRACKING SYSTEM

(75) Inventors: Nelson A. Kelly, Sterling Heights, MI (US); Thomas L. Gibson, Utica, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1721 days.

(21) Appl. No.: 11/253,069

(22) Filed: Oct. 18, 2005

(65) Prior Publication Data

US 2007/0084502 A1    Apr. 19, 2007

(51) Int. Cl.
*H01L 31/042* (2006.01)
(52) U.S. Cl. ........................................ 136/246
(58) Field of Classification Search .............. 136/244
See application file for complete search history.

(56) References Cited

U.S. PATENT DOCUMENTS

| | | | |
|---|---|---|---|
| 4,167,178 A | 9/1979 | Brussels | |
| 4,355,896 A | 10/1982 | Laue | |
| 4,522,193 A | 6/1985 | Bates | |
| 4,549,078 A * | 10/1985 | Monahan | 250/203.1 |
| 4,733,506 A | 3/1988 | Gunnarshaug | |
| 4,933,020 A | 6/1990 | Wenzel | |
| 4,999,059 A | 3/1991 | Bagno | 136/248 |
| 5,317,145 A | 5/1994 | Corio | |
| 5,851,309 A | 12/1998 | Kousa | 136/248 |
| 6,417,500 B1 | 7/2002 | Wood | |
| 2003/0201008 A1 * | 10/2003 | Lawheed | 136/246 |
| 2005/0043866 A1 * | 2/2005 | Litchfield et al. | 701/13 |
| 2005/0178427 A1 | 8/2005 | Kelly et al. | 136/246 |

FOREIGN PATENT DOCUMENTS

DE    102005013334    9/2006

OTHER PUBLICATIONS

Rainbow Power Company Ltd http://web.archive.org/web/20041011043106/http://www.rpc.com.au/index.html (Aug. 2004).*
International Search Report dated May 11, 2007 for PCT/US06/37619 corresponding to this application.

* cited by examiner

*Primary Examiner* — Mark F Huff
*Assistant Examiner* — Dustin Q Dam
(74) *Attorney, Agent, or Firm* — Reising Ethington P.C.

(57) ABSTRACT

An array of solar powered photovoltaic modules is optimally oriented and operated to provide more electrical energy for uses such as powering an electrolyzer system for hydrogen production. The array is positioned with its light receiving surface at an optimal angle, preferably a continually changing angle determined by two-axis solar tracking, when continually measured solar irradiance indicates suitable sunlight, and at a horizontal position when measured solar irradiance indicates excessive atmospheric cloudiness.

7 Claims, 2 Drawing Sheets

SOLAR PHOTOVOLTAIC OUTPUT FOR CLOUDY CONDITIONS WITH A SOLAR TRACKING SYSTEM

TECHNICAL FIELD

This invention pertains to the terrestrial positioning of modules of photovoltaic cells with respect to the sun. The invention is particularly concerned with efficient investment in photovoltaic modules and optimized use of such modules to provide electrical power, such as that for the electrolytic production of hydrogen from water.

BACKGROUND OF THE INVENTION

Photovoltaic (PV) cells are known semiconductor devices that convert light (i.e. by photons impinging on a pn junction) into electrical energy. Of course, sunlight can be used as the source of energy. Amorphous silicon, crystalline silicon, and selenium are examples of materials that are used in devising such cells. The voltage provided by an individual cell may be relatively small but many such cells can be combined as modules in electrical series and/or parallel connections to produce electrical power at voltage and current levels suitable for many applications. The modules are often constructed with flat surfaces to receive the incident light.

Solar hydrogen generation by photovoltaic-electrolyzer (PV-electrolyzer) systems is a potentially important, renewable and environmentally beneficial energy source for hydrogen fueled devices such as fuel cells. Planar modules of clusters of photovoltaic cells can be arranged to produce direct current voltage and current levels for a system of electrolysis cells to produce hydrogen and oxygen from water. In other words, an electrolysis system can be devised to deliver hydrogen gas at a required or design rate. And a photovoltaic system can be designed to provide electrical power for the specified electrolysis system. However, there is a challenge in the design and operation of a photovoltaic system because of the large variation in solar radiant flux density (irradiance) at virtually every location on the surface of the earth.

The planar module, or cluster of modules which is called an array, represents a relatively high investment cost per unit of required power and they require substantial land area in which to receive sunlight. If the PV-electrolysis systems are to be located in populated areas their size is a critical design consideration. So they must be operated to make good use of available sunlight.

Photovoltaic modules are typically installed as arrays of modules with a fixed orientation depending on the site characteristics and cost constraints. One orientation that is used on flat roofs is the so-called horizontal configuration in which the modules face straight up towards the sky. Another fixed configuration, that is considered the best overall fixed configuration for PV installations in North America, is one in which the modules face south and are tilted with respect to the ground at an angle equal to the site latitude. For example, for Detroit, with a latitude of approximately 42 degrees north of the equator, the modules would be tilted at a 42 degree angle with respect to the ground. The angle between the sun's position and the surface of the earth is called the solar altitude angle. Some references recommend using a module tilt angle equal to 90% of the latitude, e.g. a tilt of 38 degrees for Detroit, since this gives higher PV energy output in the summer, when there is more solar energy available. However, this configuration would give less solar energy in the winter, so it may or may not be superior depending on the seasonal energy needs of the user.

On sunny days, so-called two-axis solar tracking—continually orienting the solar modules perpendicular to the rays of the sun throughout each day of the year—produces the maximum energy. This is because the response of a solar module to a ray of light is proportional to the cosine of the angle between a line perpendicular to the module surface and the solar ray impinging on the surface. If the solar radiation is perpendicular to the surface, the maximum power for a given solar flux will be obtained (cosine $0°=1$). For solar radiation impinging at 90 degrees from the normal, no power will be produced (cosine $90°=0$). While two-axis solar tracking keeps the planar module facing the sun, it does not take into account the variation in solar irradiance due to atmospheric cloud cover and variation in the cloud coverage.

This invention provides a method of operation for a PV module under varying atmospheric conditions, continually positioning the module to make good use of sunlight in both cloudless and cloudy conditions.

SUMMARY OF THE INVENTION

This invention provides a PV directional control method that is applicable to modules of a plurality of solar powered photovoltaic cells, especially modules with planar light-receiving surfaces. The method has general utility to maximize the energy output of solar powered PV cells, and it has particular utility where the module(s) is used to power an electrolyzer system to produce hydrogen and oxygen from water because of the initial and operating costs of the PV systems. The method is aimed at making optimal use of the module(s) and reducing the size and cost of the PV power system as well as the physical space required for its placement and operation. Accordingly, the method of this invention is preferably considered in the design of the module for a particular geographical location.

In most geographical locations there are many daylight hours in which the sun is obscured by atmospheric cloud cover. Even in locations known for abundant sunshine there are times when the solar radiation available to PV cells is substantially reduced by intervening clouds. A PV module performs well in cloudless sunlight using conventional two-axis tracking. But the PV module control method of this invention is based on the unexpected discovery that a PV module receives more solar energy in a horizontal position (facing upwardly) when there is appreciable cloud cover. As will be described in more detail below in this specification, a planar PV module receives more sunlight in a horizontal position when the total solar irradiance is relatively low due to heavy cloud cover. Application of this factor permits more efficient use of the PV module under such operating conditions. This enables a module of given design capacity to be more fully utilized, reducing both the initial cost of the PV system and the space required for powering an electrical load, such as a hydrogen producing electrolyzer.

Accordingly, each PV module is supported so as to be movable through a range of tilted positions following and facing the sun (two-axis solar tracking). But, in addition to the solar tracking mode of operation, the module is also movable to a horizontal position, facing upwardly. And a control method is provided to determine which PV module position gathers the most solar energy at each moment of daylight operation.

In a generalized statement of the control method, the irradiance of the sun is continually measured in, for example, watts per square meter of incident surface ($W/m^2$). By way of example, peak sun irradiance at the surface of the earth may reach peak values of 1000 $W/m^2$ and this radiation flux density will sometimes be referred to in this specification as "one sun." The operation of the module is managed according to the value of the measured irradiance. Whenever the measured solar irradiance is below a predetermined value relative to the clear-sky value the module is moved to a horizontal position. Solar radiance measurements at such low levels will occur due to wide-spread cloud cover of the sky. And whenever the measured solar irradiance exceeds the predetermined minimum value for the location, the module is positioned according to two-axis solar tracking for the location, day of year, and time of day.

In accordance with a preferred embodiment of the invention, a proposed PV control method would use a conventional two-axis tracking system with the following additions: 1) it would have one small solar radiation measuring cell fixed horizontally (H), and another fixed with a south-facing latitude tilt (L). At times when there was direct sunshine, the L sensor would have a greater output than the H sensor, and the tracking system would align the solar panels with the sun using well-known technologies and algorithms for maximum output. When H>L, say H>1.3×L, a signal would be generated which would cause (by an algorithm) the solar tracker to position the solar modules to face up towards the sky (horizontal). This would presumably be at times when there was near complete cloud cover. It is estimated that this would provide from 30-80% greater solar energy under overcast conditions than tracking the sun or having a latitude tilt.

In another embodiment of the invention, global, direct and diffuse, radiation is used to determine when to switch from two-axis tracking to the horizontal mode. For example, two solar radiation sensors are mounted horizontally. One sensor (sensor 1) is shaded from direct radiation from the sun (solar disk) and measures the diffuse radiation. This can be accomplished with a shadow band that shades the sensor from direct sunshine as the sun moves across the sky or with a small shading disk attached to a small two-axis tracker. The other sensor (sensor 2) is not shaded and measures the global horizontal radiation. The difference between the two sensors is the direct radiation from the sun. When the sky is heavily overcast, the direct component of the solar radiation is near zero. For such times an array of solar modules would be oriented horizontally to capture the most solar energy under heavily overcast conditions. When the direct component is significant, the regular two-axis tracking of the sun by the array of solar modules would take place to capture the most solar energy under sunny or partly cloudy conditions.

While the energy output of a PV system is optimized during periods of ample sunshine by two-axis movement of the module, the practice of this invention still provides advantages when the module is simply moved between a two-axis tracking mode and a horizontal position mode, depending on the relative solar irradiance.

Other objects and advantages of the invention will be apparent from a detailed description of preferred embodiments.

DESCRIPTION OF PREFERRED EMBODIMENTS

Figure 1:
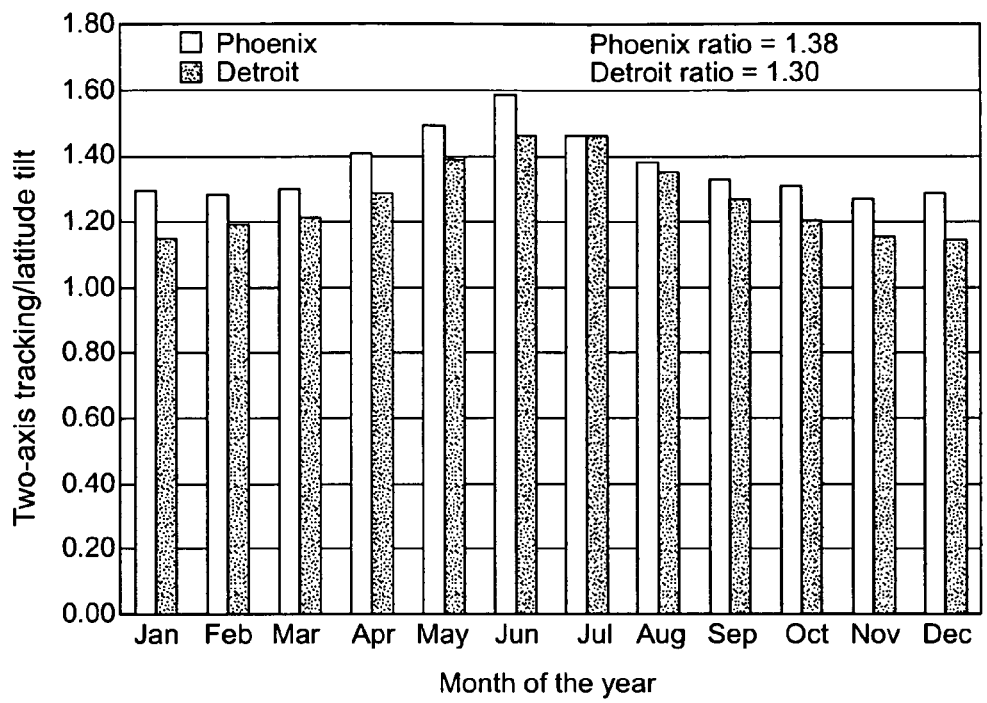
FIG. 1 is a graph of the ratio of solar irradiance realized by a PV system for two-axis tracking with the module versus a fixed latitude tilt of the module. The ratio is expressed as peak sun hours, PSH, where PSH equals the number of per day hours with a solar irradiance of 1000 W/m². The data is from the National Renewable Energy laboratory (NREL) solar radiation data site (http://rredc.nrel.gov/solar/pubs/redbook/). The ratios are presented as average monthly data over a year for Detroit and Phoenix.

Expected PV Improvement with a Two-Axis Tracking System

The sun's location in the sky relative to a location on the surface of the earth can be specified by two angles: 1) the solar azimuth angle and the solar zenith angle. The solar azimuth angle is the location of the sun in the sky relative to a line running due north. An azimuthal angle of 180 degrees occurs when the sun is due south and defines solar noon at the location of interest. On a sunny day this will be the time of maximum solar insolation provided there are no clouds. By way of example, the solar insolation of a northern US location, Detroit, Mich. and a southern location, Phoenix, Ariz. will be considered and compared.

For Detroit, Mich. at the winter solstice, the sun rises in the eastern sky at 8 AM at an azimuthal angle of 120 degrees and sets in the western sky at 5:00 PM with an azimuthal angle of 238 degrees, moving only 118 degrees across the southern horizon. At the summer solstice in Detroit, the sun rises at 6 AM (daylight savings time) at an azimuthal angle of 57 degrees and sets at 9:10 PM at an azimuthal angle of 303 degrees, moving over 246 degrees across the southern horizon. The solar zenith angle is the angle between the sun's position and that for a line perpendicular to the earth's surface. It is the compliment of the solar altitude angle, i.e., the solar zenith angle=90°—the solar altitude angle. At solar noon the zenith angle is 71 degrees in Detroit for the winter solstice and 24 degrees for the summer solstice. A two-axis tracking system moves PV modules so that they remain perpendicular to the sun's direct rays as the sun makes its daily movement across the sky (east-west tracking) and also adjusts for the slow change in that movement as the seasons change (north-south tracking).

A two-axis tracking system is most effective in improving PV performance when there are no clouds between the sun and the PV modules. The solar energy striking the earth's surface, called the global solar energy, is made up of two major components: a component directly from the solar disk (direct) and a skylight component from scattered radiation (diffuse). A third component, reflection from the ground (albedo) is generally small unless snow is present, so it will be neglected in this discussion. On cloud-free days 85-90% of the suns energy comes from the direct component, while the other 10-15% is diffuse radiation from the sky (mostly scatted from atmospheric aerosol). On cloudy days nearly all of the solar energy is from the diffuse component. Since diffuse solar radiation is not aligned in a parallel fashion like direct radiation, tracking the sun does not increase (and, as will shown below in this text, can actually decrease) the solar energy from a PV system on cloudy days.

The National Renewable Energy Laboratory (NREL) has compiled a data base for solar energy at 239 U.S. sites over a 30-year period from 1961 to 1990 (http://rredc.nrel.gov/solar/pubs/redbook/). This data base is referred to as the "Solar Radiation Data Manual for Flat Plate and Concentrating Collectors". Using this data base, FIG. 1 was prepared, and it shows the increase in the solar energy, as measured by the number of peak sun hours (equivalent to the number of hours per day with a solar irradiance of 1000 W/m$^2$, abbreviated PSH), using a two-axis tracking system versus that for a fixed latitude tilt (the best overall fixed tilt) for Detroit, Mich. and Phoenix, Ariz.

The two-axis tracking shows an overall increase in solar energy of 30% in Detroit and 38% in Phoenix versus the same PV system without solar tracking. This range of increases is consistent with the claims of a manufacturer of two-axis tracking systems (Wattsun, web site www.wattsun.com). Thus, two-axis tracking can provide about a third more energy from the same area PV modules versus the optimal fixed module tilt (latitude tilt). As shown in FIG. 1, two-axis tracking provides the most improvement relative to a fixed latitude tilt system for the months with the greatest sunshine, i.e., from April to September with a peak in June in both Detroit and Phoenix.

The Effect of Solar Tracking on Cloudy Days

FIG. 1 shows that a two-axis tracking PV system can produce a dramatic increase in the solar energy produced by a PV system. This improvement is most apparent in June in Phoenix, where it reaches 60% and least in Detroit in December when it is less than 20%. However, it is found that a tracking system works best on sunny days and worst on cloudy days. This is an important consideration, since it will affect the size and cost of a PV system needed to drive an electrolyzer to produce hydrogen for a fuel cell vehicle (FCV). And the PV system needs to be capable of efficient operation in a variety of geographical locations to serve hydrogen fuel cell powered vehicles traveling between such locations. In order to reduce the cost of that system, it would be very beneficial to boost the solar output on cloudy days. Unfortunately, this cannot be done using solar concentrators, since they can only focus direct (parallel) rays from the sun.

However, we have found that pointing the modules straight up towards the sky (horizontally, H condition) during overcast conditions results in significantly more solar irradiance than having the modules tilted towards the obscured sun (directly toward the sun, DTS condition). Moreover, it would be a simple matter to add some hardware and software to a conventional two-axis tracking system so that it will extract the maximum energy from solar modules by tracking the sun on sunny days, but orienting the modules horizontally on cloudy days, or during shorter cloudy periods. We first discovered this while testing the solar module output on cloudy days in the fall of 2004 in Warren Mich. and confirmed our findings in the spring of 2005. Table 1 below shows the results of measurements from two large solar modules (Sharp NT185U1 and Sanyo HIP-G751BA2), a photodiode made by UDT Sensors, Inc. (UDT PIN-10DP/SB), two small solar modules (Connecticut Solar 125 mm×227 mm and Powerfilm MPT3.6-75i), and a pyranometer made by Eppley Laboratories (Eppley Laboratories Black and White Pyranometer, model 8-48) on four overcast days during the fall of 2004 and spring of 2005 in Detroit. The UDT photodiode was calibrated by NREL and was used to compute the solar irradiance (reported as the number of suns, where one sun=1000 W/m$^2$). The UDT photodiode was also validated across a range of conditions by comparison with the Eppley pyranometer which was also calibrated by NREL; Eppley pyranometers are widely used to measure the total solar radiation at the surface of the earth.

As shown in Table 1, for 20 measurements on cloudy days orienting the solar sensors horizontally (H) increases their output by a factor of 1.31 to 1.82 (mean ratio=1.48±0.16) compared to the directly-toward-the-sun (DTS) orientation. This 48% average increase in energy with the H configuration over the DTS configuration is in marked contrast to the results in FIG. 1, which shows that solar tracking (DTS) increases the PV solar output by 30% versus the best fixed-tilt configuration (latitude tilt) in Detroit over the course of the whole year. Examining the same NREL data base that was used to prepare FIG. 1 revealed that over the course of a year a fixed latitude tilt provides 10-15% more solar energy from a PV module than a fixed horizontal tilt (H configuration) for both Detroit and Phoenix, so the H configuration is not an optimal tilt over a long period. The results in FIG. 1 are dominated by sunny or partly sunny conditions, while the results in Table 1 were obtained under heavily overcast conditions with a solar irradiance of 0.07 to 0.25 suns (a solar irradiance of 1000 W/m$^2$ is referred to as one sun). It is believed that the increase with the H condition in Table 1 is due to the sensor or module gathering solar energy from the whole cloud-covered (bright) sky, while for the DTS condition the panel is irradiated partly by reflected solar energy from the sky and partly by reflected solar energy from the (dark) ground. The reflected radiation from the darker ground is known to be significantly less than that from the sky.

TABLE 1

Measurements of the solar output from six solar irradiance sensors for H and DTS configurations on overcast days in Warren, MI.

| Date | Time | Solar sensor[a] | Suns[b] | Horizontal (H) | Directly toward sun (DTS) | H/DTS ratio | Zenith Angle[c] (degrees) |
|---|---|---|---|---|---|---|---|
| Oct. 26, 2004 | 4:30 PM | UDT | 0.13 | 2.71 mA | 1.49 mA | 1.82 | 55 |
| Oct. 26, 2004 | 4:30 PM | Sharp | | 0.46 A | 0.28 A | 1.64 | |
| Nov. 3, 2004 | 1:40 PM | UDT | 0.14 | 2.86 mA | 1.81 mA | 1.58 | 58 |
| Nov. 3, 2004 | 1:40 PM | Eppley | | 1.1 mV | 0.8 mV | 1.38 | |
| Nov. 11, 2004 | 1:05 PM | UDT | 0.19 | 4.06 mA | 2.3 mA | 1.77 | 60 |
| Nov. 11, 2004 | 1:05 PM | Eppley | | 1.5 mV | 1.0 mV | 1.50 | |
| Nov. 11, 2004 | 1:05 PM | Sharp | | 0.75 A | 0.46 A | 1.63 | |
| Nov. 11, 2004 | 1:05 PM | Sanyo | | 0.50 A | 0.32 A | 1.67 | |
| Apr. 7, 2005 | 10:40 AM | UDT | 0.07 | 1.45 mA | 1.02 mA | 1.42 | 52 |
| Apr. 7, 2005 | 11:10 AM | UDT | 0.25 | 5.34 mA | 3.86 mA | 1.38 | 43 |
| Apr. 7, 2005 | 11:25 AM | UDT | 0.17 | 3.55 mA | 2.58 mA | 1.38 | 45 |
| Apr. 7, 2005 | 1:00 PM | UDT | 0.07 | 1.49 mA | 1.07 mA | 1.39 | 54 |
| Apr. 7, 2005 | 1:00 PM | Conn. Solar | | 50.2 mA | 38.2 mA | 1.31 | |

TABLE 1-continued

Measurements of the solar output from six solar irradiance sensors for H and DTS configurations on overcast days in Warren, MI.

| Date | Time | Solar sensor [a] | Suns [b] | Horizontal (H) | Directly toward sun (DTS) | H/DTS ratio | Zenith Angle [c] (degrees) |
|---|---|---|---|---|---|---|---|
| Apr. 7, 2005 | 1:00 PM | Power Film | | 50.2 mA | 38.2 mA | 1.31 | |
| Apr. 7, 2005 | 1:50 PM | UDT | 0.06 | 1.28 mA | 0.98 mA | 1.31 | 55 |
| Apr. 7, 2005 | 1:50 PM | Conn. Solar | | 49.2 mA | 37.5 mA | 1.31 | |
| Apr. 7, 2005 | 1:50 PM | Power Film | | 3.15 mA | 2.20 mA | 1.43 | |
| Apr. 7, 2005 | 3:20 PM | UDT | 0.12 | 2.57 mA | 1.76 mA | 1.46 | 48 |
| Apr. 7, 2005 | 3:20 PM | Conn. Solar | | 104.0 mA | 75.7 mA | 1.37 | |
| Apr. 7, 2005 | 3:20 PM | Power Film | | 6.84 mA | 4.53 mA | 1.51 | |

[a] UDT = United Detector Technologies Model PIN 10DP/SB photodiode (c-Si based); Sharp = Model NT185U1 module (c-Si based); Sanyo = Model HIP-G751BA2 module (combination of c-Si and a-Si materials); Eppley = Model 8-48 Black and White Pyranometer; Conn. Solar = Connecticut Solar 125 mm × 227 mm module (c-Si based); Power Film = Model MPT3.6-75 module (a-Si based).
[b] Suns = (measured W/m$^2$)/(1000 W/m$^2$)
[c] Zenith angle obtained from U.S. Naval Observatory web site, http://aa.usno.navy.mil An object of this invention is to enable the use of PV energy to drive the electrolysis of water to make hydrogen in a home refueling system for hydrogen fuel cell powered vehicles. It is important to increase the solar energy available from a PV system on cloudy days because the system needs to be sized to produce enough hydrogen to fuel a fuel cell vehicle on the days with the least sunshine (cloudy days), or the convenience of such a system for the customer could be lost. Positioning the panels with an H configuration can provide 30-80% greater energy than tilting the panels toward the sun on cloudy days—a major improvement. On the other hand it is imperative to have the system produce the most energy on sunny days and partly sunny days, so a two-axis tracking system is needed. Therefore, the control method uses a two-axis tracking system that tracks the sun on days when direct sunshine is available, but goes to an H configuration when it is overcast. Determining the increase in total energy that can be gained on overcast days by using the H configuration will require additional data collected over a large number of days and meteorological conditions. However, based on the data in Table 1, it is apparent that when it is overcast and the solar irradiance is less than 250 W/m$^2$ (<0.25 suns), the H configuration is superior to the DTS configuration.

Figure 2:
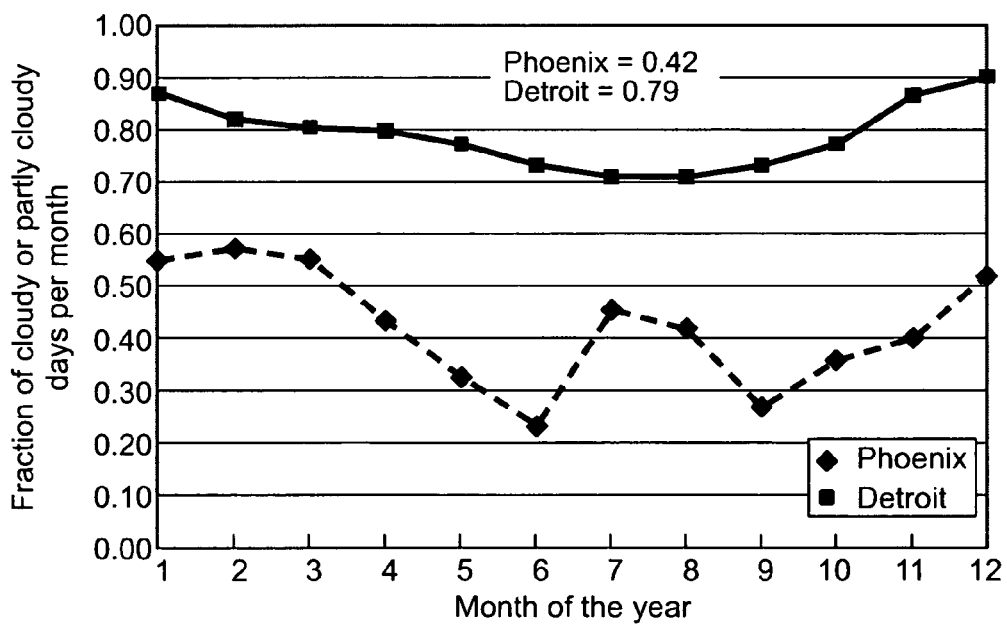
FIG. 2 is a graph of the fraction of cloudy or partly cloudy days in Phoenix (filled diamond data points) and Detroit (filled square data points) for each month over a twelve month period. The data is from the University of Utah meteorology site (http://www.met.utah.edu/jhorel/html/wx/climate/cldy.html).
Figure 3:
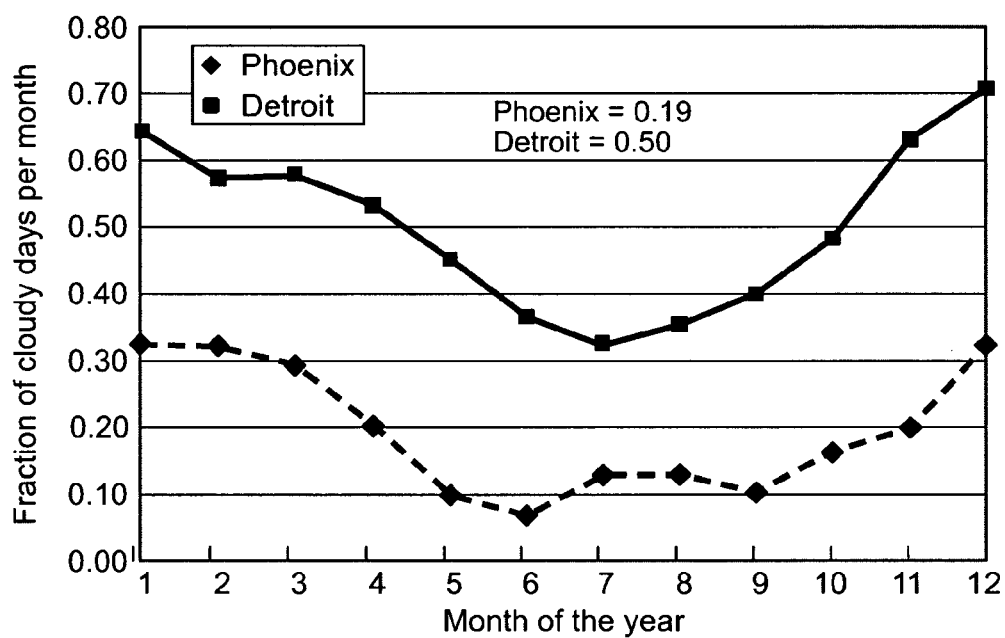
FIG. 3 is a graph of the fraction of cloudy days in Phoenix (filled diamond data points) and Detroit (filled square data points) for each month over a twelve month period. The data is from the University of Utah meteorology site (http://www.met.utah.edu/jhorel/html/wx/climate/cldy.html).

FIG. 2 shows that there are significant percentages of cloudy or partly cloudy days in Detroit (79%) and even in Phoenix (42%). FIG. 3 considers only cloudy days for the two cities; 50% of the days in Detroit were cloudy and 19% of the days in Phoenix were cloudy. Therefore, the advantages of an H panel adjustment for cloudy days or cloudy periods will be useful a significant percentage of the time and even at sites like Phoenix that are considered sunny. The invention will most likely yield the largest increase in solar energy collection on heavily overcast days, which are an unknown fraction of the cloudy days.

Determining the Positioning of the PV Modules

The practice of the invention requires the use of one or more solar radiation sensors to determine when photovoltaic modules should be tilted in accordance with two-axis solar tracking for optimal absorbance of solar irradiance or when the modules should be positioned horizontally.

In one embodiment of the practice of the invention the irradiance of the sun is continually measured in, for example, watts per square meter of incident surface (W/m$^2$) using a single sensor. As stated above, the peak sun irradiance at the surface of the earth may reach 1000 W/m$^2$ ("one sun"). The operation of the module is managed according to the value of the measured irradiance. Whenever the measured solar irradiance is below a predetermined value relative to the clear-sky value the module is moved to a horizontal position. Solar irradiance measurements at such low levels will occur due to wide-spread cloud cover of the sky. And whenever the measured solar irradiance exceeds the predetermined minimum value for the location, the module is positioned according to two-axis solar tracking for the location, day of year, and time of day.

Simple algorithms for comparison of measured values of solar irradiance with reference data or with values obtained by other sensors are available or readily devised.

In another embodiment, a preferred embodiment, a photovoltaic cell control method uses a conventional two-axis tracking system (such as one of those made by Wattsun Solar Trackers, Albuquerque, N. Mex.) with the following additions: 1) it would have one small (UDT type) solar cell fixed horizontally (H), and another fixed with a south-facing latitude (in the Northern Hemisphere) tilt (L). At times when there was direct sunshine, the L sensor would have a greater output than the H sensor, and the tracking system would align the solar panels with the sun using well-known technologies and algorithms for maximum output. When H>L, say H>1.3× L, a signal would be generated which would cause (by an algorithm) the solar tracker to position the solar modules to face up towards the sky (horizontal). This would presumably be at times when there was near complete cloud cover. It is estimated that this would provide from 30-80% greater solar energy under overcast conditions than tracking the sun or having a latitude tilt. In the wintertime in Detroit over 80% of the days are cloudy or partly cloudy (FIG. 2) and about two-thirds of the days are cloudy (FIG. 3). During the winter many of the cloudy days are heavily overcast (the types of days studied in Table 1). The average increase in the H/DTS ratio in Table 1 is approximately 50% for heavily overcast conditions. If half of the cloudy wintertime days are the heavy overcast type, the subject tracking system would increase the collected solar energy by approximately 50% over a regular two-axis tracking system for the one-third of the days with the lowest solar insolation. This wintertime increase in solar energy collection in Detroit occurs when additional energy is most needed due to the shorter wintertime daylight periods. If the solar array was providing energy to produce hydrogen from water electrolysis, and if the hydrogen was being used to provide most or all of the hydrogen to refuel a fuel cell vehicle, then the PV system could be sized with less PV area and still make enough hydrogen on cloudy days in the wintertime. (On sunny days in the summer or winter the excess energy produced by the PV system could be used to power the system owner's home electrical needs or be sold back to the utility company). In order to have a system with minimal hydrogen storage and reduced cost, it is important to improve the solar hydrogen system's output on cloudy days when less solar energy is available. This tracking system and algorithm will allow such a system to be built.

In still another embodiment of the practice of the invention, two solar radiation sensors, mounted horizontally, are used to determine when to switch from two-axis solar tracking to the horizontal mode. This method utilizes measurements of global, direct, and diffuse, radiation for this determination. One sensor (sensor 1) is shaded from direct radiation from the solar disk and measures the diffuse radiation. This can be accomplished with a shadow band that shades sensor 1 from direct sunshine as the sun moves across the sky or with a small shading disk attached to a small two-axis tracker. The other sensor (sensor 2) is not shaded and measures the global horizontal radiation. The difference between the two sensors is the direct radiation from the sun. A commercially available product that makes measurements of the global, direct, and diffuse solar components using a single detector is available from Yankee Environmental Systems, Inc, (web site, www.y-ces.com) and is called a Single Detector Rotating Shadow Band Radiometer (SDR-1). When the sky is heavily overcast, the direct component of the solar radiation is near zero. For such times an array of solar modules would be oriented horizontally to capture the most solar energy under heavily overcast conditions. When the direct component is significant, the regular two-axis tracking of the sun by the array of solar modules would take place to capture the most solar energy under sunny or partly cloudy conditions.

The invention has been described in terms of certain preferred embodiments but it is not limited by the illustrated methods.

The invention claimed is:

1. A method of positioning a light-receiving surface of a module or modules of solar-powered photovoltaic cells during daylight hours, the module being located on the terrestrial surface and operated at a known latitude, the method comprising:
    using at least one radiation-detecting sensor in the vicinity of the module to continually measure solar irradiance representative of solar radiation available for the light-receiving surface of the module;
    continually comparing the measured solar irradiance value with a comparative value for conditions of atmospheric cloud cover;
    positioning the light-receiving surface of the module toward the sun in accordance with two-axis sun tracking when the measured solar irradiance exceeds the comparative value for atmospheric cloud cover;
    positioning the light receiving surface of the module horizontally, facing upwardly, when the measured solar irradiance does not exceed the comparative value; and
    continually re-positioning the light-receiving surface of the module between its toward-the-sun and horizontal positions in accordance with the comparison of the measured solar irradiance value with the comparative value to continually optimize the solar energy captured by the photovoltaic cells.

2. A method of positioning a light-receiving surface of a module of solar-powered photovoltaic cells as recited in claim 1 in which the module is connected to an electrical load as the source of electrical energy for the electrical load, and electrical energy is drawn from the module to the load whether the module is in its sun tracking position or its horizontal position.

3. A method of positioning a light-receiving surface of a module of solar-powered photovoltaic cells as recited in claim 1, further comprising:
    continually measuring solar irradiance at a toward-the-sun angle for the light-receiving surface of the module with a first sensor and at a horizontal position of the light-receiving surface with a second sensor;
    positioning the light-receiving surface of the module toward the sun in accordance with two-axis sun tracking when the measured solar irradiance at the first sensor exceeds the measured solar irradiance at the second sensor by a predetermined value; and
    positioning the light receiving surface of the module horizontally, facing upwardly, when the measured solar irradiance at the second sensor exceeds the measured solar irradiance at the first sensor by a predetermined value.

4. A method of positioning a light-receiving surface of a module of solar-powered photovoltaic cells as recited in claim 1, further comprising:
    continually measuring diffuse solar irradiance for the light-receiving surface of the module with a first horizontal sensor that is shaded from direct radiation from the sun;
    continually measuring direct plus diffuse solar irradiance with a second horizontal sensor;
    positioning the light-receiving surface of the module toward the sun in accordance with two-axis sun tracking when the measured solar irradiance at the second horizontal sensor exceeds the measured solar irradiance at the first horizontal sensor by a first predetermined value; and
    positioning the light receiving surface of the module horizontally, facing upwardly, when the difference between measured solar irradiance values of the second horizontal sensor and the first horizontal sensor is less than a second predetermined value.

5. A method of positioning a light-receiving surface of a module of solar-powered photovoltaic cells used in delivering electrical energy to a hydrogen producing electrolyzer, the module being located on the terrestrial surface for operation at a known latitude, the method comprising:
    using at least one radiation-detecting sensor in the vicinity of the module to continually measure solar irradiance available for the light-receiving surface of the module;
    continually comparing the measured solar irradiance value with a comparative value for atmospheric cloud cover;
    positioning the light-receiving surface of the module toward the sun in accordance with two-axis sun tracking when the measured solar irradiance exceeds the comparative value for conditions of atmospheric cloud cover;
    positioning the light receiving surface of the module horizontally, facing upwardly, when the measured solar irradiance does not exceed the comparative value;
    drawing electrical energy from the module to the hydrogen producing electrolyzer whether the module is in its sun tracking position or its horizontal position; and
    continually re-positioning the light-receiving surface of the module between its toward-the-sun and horizontal positions in accordance with the comparison of the measured solar irradiance value with the comparative value to continually optimize the electrical energy delivered by the module of photovoltaic cells.

6. A method of positioning a light-receiving surface of a module of solar-powered photovoltaic cells as recited in claim 5, further comprising:
continually measuring solar irradiance at a toward-the-sun angle for the light-receiving surface of the module with a first sensor and at a horizontal position of the light-receiving surface with a second sensor;
positioning the light-receiving surface of the module toward the sun in accordance with two-axis sun tracking when the measured solar irradiance at the first sensor exceeds the measured solar irradiance at the second sensor by a predetermined value; and
positioning the light receiving surface of the module horizontally, facing upwardly, when the measured solar irradiance at the second sensor exceeds the measured solar irradiance at the first sensor by a predetermined value.

7. A method of positioning a light-receiving surface of a module of solar-powered photovoltaic cells as recited in claim 5, further comprising:
continually measuring diffuse solar irradiance for the light-receiving surface of the module with a first horizontal sensor that is shaded from direct radiation from the sun;
continually measuring direct plus diffuse solar irradiance with a second horizontal sensor;
positioning the light-receiving surface of the module toward the sun in accordance with two-axis sun tracking when the measured solar irradiance at the second horizontal sensor exceeds the measured solar irradiance at the first horizontal sensor by a first predetermined value; and
positioning the light receiving surface of the module horizontally, facing upwardly, when the difference between measured solar irradiance values of the second horizontal sensor and the first horizontal sensor is less than a second predetermined value.

* * * * *